July 11, 1950
J. S. BAKER
2,514,361
LIQUID LEVEL CONTROL
Filed Dec. 7, 1946
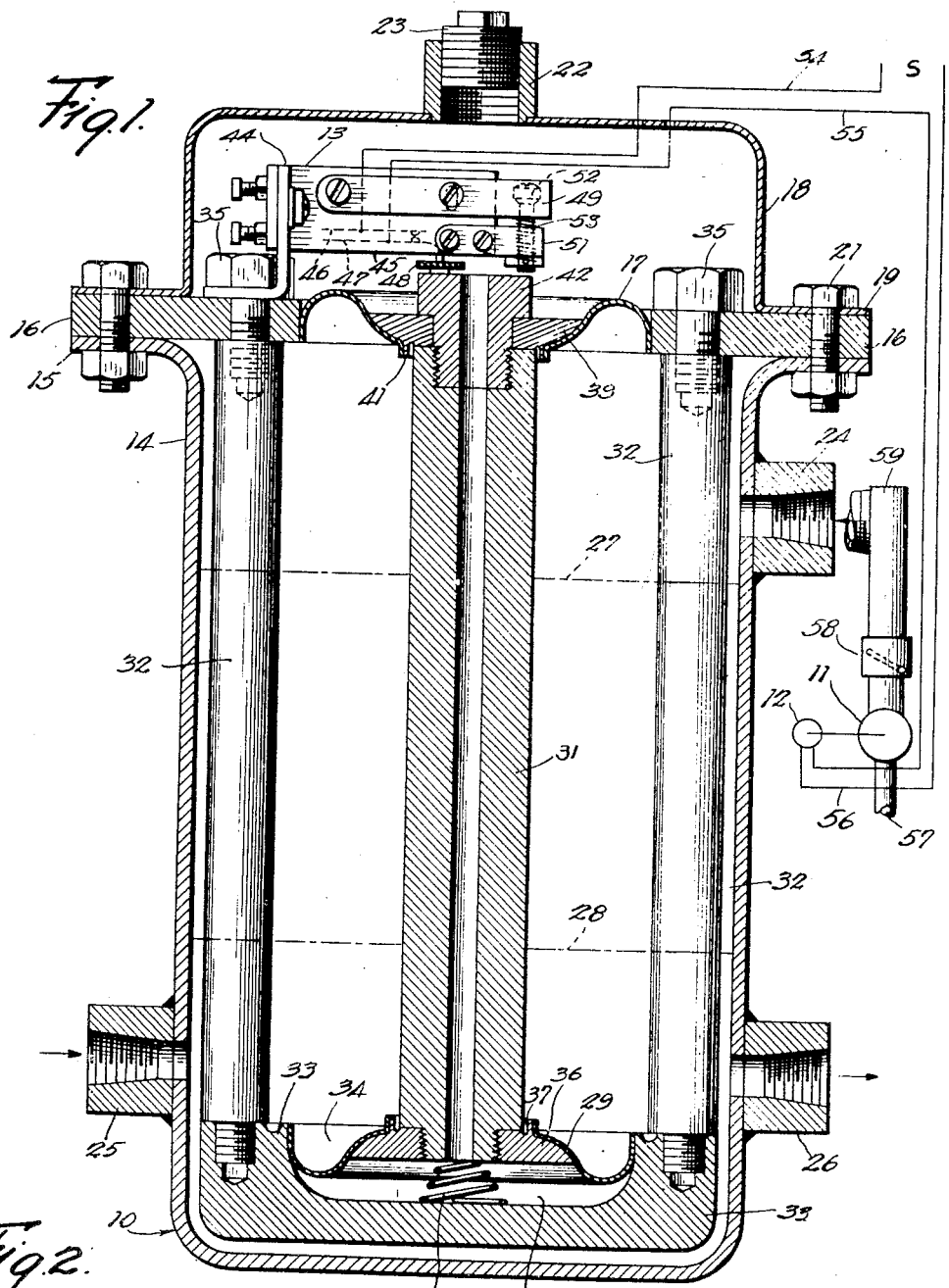
INVENTOR.
John S. Baker
BY Thiess, Olson & Mecklenburger
Attys.

Patented July 11, 1950

2,514,361

UNITED STATES PATENT OFFICE 2,514,361

LIQUID LEVEL CONTROL

John S. Baker, Chicago, Ill., assignor to Cook Electric Company, Chicago, Ill., a corporation of Illinois Application December 7, 1946, Serial No. 714,843

18 Claims. (Cl. 261—27)

This invention relates to liquid level controlling devices of the balanced pressure type for gas and liquid apparatus, and it is an object of the invention to provide improved apparatus of this character.

It is a further object of the invention to provide an improved liquid level controlling device which will operate at high pressures such as in steam boilers or at relatively low pressures such as in carbonating apparatus, and is sufficiently sensitive as to operate on pressure differentials determined by liquid levels varying only a few inches from maximum to minimum.

It is a further object of the invention to provide improved apparatus of the character indicated that is simple in form, easy to construct, and efficient in operation.

In carrying out the invention in one form, a liquid level control device for apparatus containing both liquid and gas is provided comprising a pair of spaced apart flexible diaphragms, one of the diaphragms being adapted to be subjected on one side thereof to the pressure of both the liquid and the gas, the other of the diaphragms being adapted to be subjected on one side thereof to the pressure of the gas only, means interconnecting the diaphragms whereby movement of one of the diaphragms in response to pressure thereon effects movement of the other of the diaphragms against the pressure thereon, and means responsive to a predetermined movement of one of the diaphragms for controlling the flow of liquid to the apparatus.

For a more complete understanding of the invention reference should be had to the accompanying drawing forming a part hereof in which:

Fig. 1 is substantially a sectional elevational view of apparatus embodying the invention, and Fig. 2 is a schematic representation of another embodiment of the invention.

Referring to the drawing, the invention is shown in Fig. 1 as embodied in gas and liquid mixing apparatus including the liquid level control and mixture storage device 10, the pump 11 for supplying liquid thereto, and the motor 12 for driving pump 11, the motor being controlled by a switch 13 operated by the liquid level apparatus.

The apparatus 10 comprises a tank 14 including an outwardly directed flange 15 at its upper end cooperating with a circular plate 16 for closing the upper end of the tank, the plate 16 including a central opening which is closed by a resilient or flexible diaphragm 17. Overlying circular plate 16 is an inverted cup-shaped member 18 provided with an outwardly directed flange 19 at its lower end, the flange 19, the plate 16, and the flange 15 being bolted together into a complete structure by means of bolts 21. Centrally of the upper surface of cup member 18 is a threaded connector 22 providing a passageway into the inside of cup member 18, connector 22 being threaded to be closed by a threaded plug 23.

Adjacent the upper end of tank 14 is a connector 24 providing a liquid entrance into the tank, and adjacent the bottom thereof are a pair of connectors 25 and 26 serving respectively to admit gas into the tank and to permit removal of liquid and any gas entrapped therein. Connectors 24, 25 and 26 may be attached to the tank for communication with the openings therethrough by any well known means such as welding, for example. In the operation of the device, the level of liquid within tank 14 is maintained between an upper level indicated by the dotted line 27 and a lower level indicated by the dotted line 28, the connector 24 being above the upper liquid level and the connectors 25 and 26 being below the lower level. Accordingly, any gas entering the tank through connector 25 will bubble through the liquid therein.

The apparatus responding to variations in liquid level includes the flexible diaphragm 17 at the upper end of the tank and a flexible diaphragm 29 in the tank at the lower end thereof, the two diaphragms being interconnected by a central post 31 so as to move as a unit. Suspended within tank 14 by the series of rods 32 is a base member 33 including a central cavity 34, the rods 32 being threaded into holes in base 33 and held to plate 16 by means of bolts 35. The outer periphery of diaphragm 29 is welded at the edge of cavity 34 to base 33 to form a fluid-tight connection therewith, and the inner periphery of diaphragm 29 is welded to an internally threaded annular ring 36 along the projecting flange 37 thereof. The central post 31 is threaded at its lower end to ring 36, thereby forming, in cooperation with diaphragm 29 and base member 33, a chamber 38 which is isolated or sealed from the inside of tank 14.

Diaphragm 17 is welded at its outer periphery to the inner periphery of plate 16 and at its inner periphery to the an annular ring 39, terminating along the annular flange 41. A threaded nipple 42 projects through the central opening in annular ring 39 and is threaded into post 31, forming a relatively rigid and unitary structure between the two diaphragms. Diaphragms 17 and 29 may be formed of any well known metal, and are provided with the necessary curved contour to impart the desired resilience to them. Preferably the contour of the diaphragms is of the reverse curved construction so that the necessary movements thereof may take place under the relatively high pressures which may be encountered without producing unduly high stresses within the diaphragm material. Moreover, the diaphragms may be light and respond to changes of pressure effected by a change of only several inches in liquid height. The annular rings 36 and 39 are curved along a portion of their extent to conform to the curvature of the diaphragms 29 and 17, respectively. This effects additional support to the diaphragms in their movements making it feasible to have a greater sensitivity in their operation under the relatively high pressures.

The inside surfaces of diaphragms 17 and 29 are exposed to the inside of tank 14, and accordingly, any gas inside of the tank exerts its pressure equally upon the inner surface of diaphragm 17 and the opposing surface of diaphragm 29. The diaphragms are equal in area whereby the force exerted against each by the gas pressure is the same, and consequently, no movement thereof occurs due to the gas pressure. However, since the liquid level inside of tank 14 varies between dotted lines 27 and 28, the liquid does not come into contact with the inside surface of diaphragm 17, and thus the force due to the height of the liquid is exerted only against the inside of diaphragm 29. As the liquid height varies between the two levels, the force exerted against diaphragm 29 varies and the diaphragm assembly, including the two diaphragms and the central post 31, moves thereunder. The diaphragms being resilient in character tend to assume a neutral position moving therefrom only under pressure and returning thereto when the pressure is relieved. The neutral position is not changed by the gas pressure since it is equal on the two diaphragms, but when the liquid is at the height of the dotted line 27 there is a greater amount of force being exerted against diaphragm 29 than when the liquid is at the level 28. Accordingly, the diaphragm assembly will move up or down dependent upon whether the amount of liquid in the tank is small or large. The post 31 and the nipple 42 are hollow, thereby providing communication between the inside of the cup 18 and the chamber 38 and equalizing the pressures on the outside of diaphragm 17 (in chamber formed by cup 18) and the surface of diaphragm 29 facing the chamber 38. Of course, if there were no communication between these chambers movement of the diaphragms would be hindered by the increase of pressure in one chamber and the decrease of pressure in the other. Normally the gas in these chambers is air at atmospheric pressure, but any other gas under other pressures may be used.

Ordinarily the weight of the central column 31 and the other appurtenant members would cause the diaphragms to sag somewhat under their own weight, and to eliminate this factor a coil spring 43 is mounted inside of chamber 38 and in a position to support this weight. Consequently, the pressure responsive members are mounted in a neutral position and tend to remain in this position.

Movements of diaphragms 17 and 29 are made effective to control the amount of liquid flowing into tank 14 by means of the switch mechanism 13. The switch may be of any suitable type and as shown is of the type generally known as a microswitch. As depicted, the switch mechanism comprises a yoke 44 supporting a contact housing 45 within which a pair of spring contacts 46 and 47 (shown dotted) are supported, spring contact 46 extending forwardly to be contacted by the knurled adjusting nut 48. The yoke member 49 is pivoted to the housing 45 and is held to the member 51 by means of the bolt 52, the members 51 and 52 being biased apart by means of a spring 53. The spring contacts 46 and 47 are connected respectively to conductors 54 and 55 which emerge from cup 18 through suitable insulators thereby to form a fluid-tight seal.

The diaphragms are shown in the neutral position when no liquid is in the container. Consequently, contacts 46 and 47 are closed since the liquid level is below even the low level 28. When the liquid in the tank is at the level of dotted line 27, the diaphragms deflect downwardly under the weight of the water on diaphragm 29, thereby causing nut 48 to move away from contact 47 which moves downwardly to open the circuit. However, when the level drops to that indicated by the broken line 28, resilient diaphragms 17 and 29 rise upwardly due to their own resilience, thereby causing the knurled knob 48 to cause contact 47 to close the circuit with contact 46. This closes a supply circuit to the motor 12 causing pump 11 to run, thereby forcing liquid into the tank 14. When the level of liquid in tank 14 reaches dotted line 27, the moving of knurled knob 48 away from spring contact 47 effects interruption of the power supplied to motor 12.

The power supply circuit to motor 12 from a source S is completed through a conductor 56 and conductors 54 and 55, contacts 46 and 47 closing the circuit to conductors 54 and 55. Liquid is supplied to container 14 from a source 57 through pump 11, through a check valve 58, and a conduit 59 to connector 24. Whenever the pump 11 is not operating, the check valve 58 operates to seal the conduit 59, whereby the gas pressure within tank 14 does not leak off through the liquid supply system. Such a provision is necessary in instances where the gas pressures used may be quite high, as for example in carbonating apparatus. The switch 13 operates in air or other gas and thus minimum attention need be directed to the switch for maintaining it in operating condition.

The base construction of the liquid height regulator, including the diaphragm 29 and the base 33, is constructed as a unit assembled to the plate 16, and hence, it may be removed as a unit from the tank 14, and while this is the preferred construction, it will be clear to those skilled in this art that the base 33 may be an integral part of the tank 14 or it may be constructed similarly to the upper portion of the regulator including a plate similar to plate 16 without departing from the spirit and scope of the invention. In such a construction the inside surfaces of diaphragm 29 and 17 together with the cylindrical portion of tank 14 form a chamber receiving the liquid and gas.

The regulator described may be applied to apparatus where there is purely a liquid level regulating function without at the same time having a storage or container function. Thus in Fig. 2 a liquid level regulator 61, identical in all operating respects to the regulator already described, is attached by means of a pair of conduits 62 and 63 to a tank 64, which for example may be a steam boiler in which it is desired to maintain the water level between the broken lines 65 and 66. A water supply line 67 is arranged with a water pump 68 to be driven by an electric motor 69 supplied with electric power from a source 71. The conduit 62 is above the high liquid level 65, and the conduit 63 is below the lower water level 66. Hence, as already described, when the water level reaches the level of 65 switch means are actuated to cause motor 69 to operate pump 68 thereby supplying water to boiler 64, and when the level reaches that of line 65, the mechanism operates to shut off motor 69 and thereby stop the flow of water to boiler 64.

Without further elaboration, the foregoing will so fully explain the gist of my invention that others may, by applying current knowledge, readily adapt the same for use under varying conditions of service, without eliminating certain features, which may properly be said to constitute the essential items of novelty involved, which items are intended to be defined and secured to me by the following claims.

I claim:

1. Combined gas and liquid apparatus comprising a container for both said gas and said liquid, inlet means and outlet means for said liquid, inlet means for said gas, a pair of spaced apart flexible diaphragms, one of said diaphragms forming a wall of said container and the other being disposed in said container, one of said diaphragms being oriented to be subjected on one side thereof to the pressures of both said liquid and said gas, the other one of said diaphragms being oriented to be subjected on one side thereof only to the pressure of said gas, means interconnecting said diaphragms whereby movement of one of said diaphragms in response to pressure exerted thereon effects movement of the other of said diaphragms against the pressure of the gas exerted thereon, and means responsive to a predetermined movement of one of said diaphragms for controlling the flow of liquid to said container.

2. A liquid level control device for apparatus containing both liquid and gas comprising a pair of spaced apart flexible diaphragms, one of said diaphragms being adapted to be subjected on one side thereof to the pressure of both said liquid and gas, the other one of said diaphragms being adapted to be subjected on one side thereof to the pressure of said gas only, means for subjecting the other sides of both said diaphragms to a common pressure, means interconnecting said diaphragms whereby movement of said one diaphragm in response to the pressure of gas and liquid thereon effects movement of said other diaphragm against the gas pressure exerted thereon, and means responsive to a predetermined movement of one of said diaphragms for controlling the flow of liquid to said apparatus.

3. Combined gas and liquid apparatus comprising a container for both said gas and said liquid, inlet means and outlet means for said liquid, inlet means for said gas, a pair of spaced apart flexible diaphragms in said container, one of said diaphragms being oriented to be subjected on one side thereof to the pressure of both said liquid and said gas, the other one of said diaphragms being oriented to be subjected on one side thereof only to the pressure of said gas, means for subjecting the other sides of said diaphragms to a common pressure, means interconnecting said diaphragms whereby movement of said one diaphragm in response to the pressure of gas and liquid thereon effects movement of said other of said diaphragms against the pressure of the gas exerted thereon, and means responsive to a predetermined movement of one of said diaphragms for controlling the flow of liquid to said container.

4. A liquid level control device for gas and liquid apparatus comprising a container adapted to have both gas and liquid therein, a pair of opposed flexible diaphragms in said container, said diaphragms being so oriented that the pressure of the gas in said container acts equally on the opposed sides of said diaphragms and the pressure of the liquid therein acts only on one of the opposed sides of one of said diaphragms, rigid means interconnecting said diaphragms whereby said diaphragms move as a unit under the influence of the liquid pressure, means for transmitting air pressure to the other sides of said diaphragms, and means responsive to a predetermined movement of one of said diaphragms for controlling the flow of liquid to said container.

5. A liquid level device for gas and liquid apparatus comprising a container, a pair of mechanically interconnected flexible diaphragms in said container, means for transmitting equalized pressure to one of the opposed sides of each diaphragm, means for transmitting the pressure of said gas to the other of the opposed sides of each diaphragm, means for transmitting the pressure of said liquid to one of the opposed sides receiving said gas pressure whereby to exert liquid pressure thereagainst, and means responsive to flexing of said diaphragms for controlling said liquid transmission.

6. A liquid level control device for gas and liquid apparatus comprising a pair of opposed rigidly connected resilient diaphragms, means including one side of one of said diaphragms forming a chamber, the opposed side of the other of said diaphragms being exposed to said chamber, means for supplying gas to said chamber, means for supplying liquid to said chamber, a chamber associated with each of the other sides of said diaphragms, passage means interconnecting said last mentioned chambers for supplying equal pressures to said other sides, and means responsive to the flexing of said diaphragms for controlling the supplying of liquid to said chamber.

7. A liquid level control device for gas and liquid apparatus comprising a pair of opposed rigidly connected resilient diaphragms, means including one opposed side of each diaphragm forming a chamber to receive gas and liquid, means for supplying liquid to said chamber, a chamber associated with each of the other sides of said diaphragms, passage means interconnecting said last mentioned chambers for supplying equal pressures to said other sides, and means responsive to the flexing of said diaphragms for controlling the supplying of liquid to said chamber.

8. A liquid level control device for gas and liquid apparatus comprising a pair of opposed resilient diaphragms, a post rigidly interconnecting said diaphragms substantially centrally thereof, means including one side of one of said diaphragms forming a chamber, the opposed side of the other of said diaphragms being exposed to said chamber, means for supplying liquid to said chamber, means for supplying gas to said chamber, chambers individually associated with each of the other sides of said diaphragms, said post having a passage therethrough for equalizing the pressure in said individual chambers, and means responsive to the flexing of said diaphragms for controlling the supply of liquid to said chamber.

9. A liquid level control device for gas and liquid apparatus comprising a pair of opposed resilient diaphragms, a post rigidly interconnecting said diaphragms substantially centrally thereof, means including one side of one of said diaphragms forming one chamber, means supporting the other of said diaphragms within said one chamber whereby the side thereof opposed to said one side of said one diaphragm is exposed to said one chamber, said supporting means and said other diaphragm forming another chamber exposed to the other side of said one diaphragm, means for supplying liquid to said one chamber, means for supplying gas to said one chamber, and means responsive to the flexing of said diaphragms for controlling the supply of liquid to said one chamber.

10. A liquid level control device for gas and liquid apparatus comprising a pair of opposed resilient diaphragms disposed vertically relative to each other, a post rigidly interconnecting said diaphragms substantially centrally thereof, means including one side of one of said diaphragms forming one chamber, the other of said diaphragms being supported in said chamber and having the side thereof opposed to said one side of said one diaphragm exposed to said one chamber, means associated with said other diaphragm forming another chamber, said post having a passage therethrough for connecting said other chamber to tne exterior of said one diaphragm, means for biasing said diaphragms and said post to a neutral position, means for supplying liquid to said chamber, means for supplying gas to said chamber, and means responsive to the flexing of said diaphragms for controlling the supply of liquid to said one chamber.

11. A liquid level control device for gas and liquid apparatus comprising a pair of opposed resilient diaphragms disposed vertically relative to each other, a post rigidly interconnecting said diaphragms substantially centrally thereof, means including one side of one of said diaphragms forming one chamber, the other of said diaphragms being supported in said chamber and having the side thereof opposed to said one side of said one diaphragm exposed to said one chamber, means associated with said other diaphragm forming another chamber, said post having a passage therethrough for connecting said other chamber to the exterior of said one diaphragm, spring means within said other chamber for biasing said diaphragms and said post to a neutral position, means for supplying liquid to said one chamber, means for supplying gas to said one chamber, and means responsive to the flexing of said diaphragms for controlling the supply of liquid to said one chamber.

12. A liquid level control device for gas and liquid apparatus comprising a pair of opposed resilient diaphragms, a post rigidly interconnecting said diaphragms substantially centrally thereof, means including one side of one of said diaphragms forming one chamber, means supporting the other of said diaphragms within said one chamber whereby the side thereof opposed to said one side of said one diaphragm is exposed to said one chamber, said supporting means and said other diaphragm forming another chamber exposed to the other side of said other diaphragm, spring means within said other chamber for biasing said diaphragms and said post to a neutral position, means for supplying liquid to said one chamber, means for supplying gas to said one chamber, and means responsive to movement of said diaphragms for controlling the supply of liquid to said one chamber.

13. A liquid level control device for gas and liquid apparatus comprising a housing having a pressure chamber therein and means for supplying gas and liquid to said chamber, an outlet for said chamber, operatively connected opposed diaphragms each having an equal surface exposed to said pressure chamber and movable by a varying level of the liquid in said chamber, an actuator disposed outside of said chamber for controlling the relative volume of liquid supplied to said pressure chamber by said supply means, and means carried adjacent one of said diaphragms and actuable thereby to actuate said actuator.

14. A liquid level control device comprising a tank with an open end, a cover for said end, a plate disposed between said tank and said cover, standards extending into said tank from said plate, a base member secured to the ends of said standards, said plate and said base member each having a pressure responsive diaphragm carried thereon, and a connecting member between said diaphragms and movable therewith.

15. A liquid level control device comprising a tank with an open end, a cover for said end, a plate disposed between said tank and said cover, standards extending into said tank from said plate, a base member secured to the ends of said standards, said plate and said base member each having a pressure responsive diaphragm carried thereon, a connecting member between said diaphragms and movable therewith and a liquid supply actuator disposed in said cover and actuable by movement of said diaphragms.

16. A liquid level control device for gas and liquid apparatus comprising a housing having a pressure chamber therein, means for supplying gas and liquid to said chamber, there being an outlet for the same, a pair of operatively connected auxiliary chambers, a pair of opposed diaphragms each having an equal surface exposed to said pressure chamber and an equal surface exposed to said auxiliary chambers, an actuator to energize said liquid supply means, and means operated by movement of said diaphragms to operate said actuator.

17. A liquid level control device for gas and liquid apparatus comprising a housing having a pressure chamber therein and means for supplying gas and liquid to said chamber, an outlet for said chamber, opposed diaphragms each having an equal surface exposed to said pressure chamber, one of said diaphragms being subjected to the pressure of the gas and the other of said diaphragms being subjected to the combined pressure of the gas and the liquid, means subjecting the rear faces of said diaphragms to an equal pressure, an actuator to energize said liquid supply means, and means operated by movement of said diaphragm subjected to the combined pressures of the gas and liquid for operating said actuator.

18. A liquid level control device for gas and liquid apparatus comprising a housing having a pressure chamber therein and means for supplying gas and liquid to said chamber, an outlet for said chamber, opposed diaphragms each having an equal surface exposed to said pressure chamber, one of said diaphragms being subjected to the pressure of the gas and the other of said diaphragms being subjected to the combined pressure of the gas and the liquid, means subjecting the rear faces of said diaphragms to an equal pressure, an actuator to control the action of said supply means whereby to control the relative volume of liquid supplied to said pressure chamber, and means operated by movement of said diaphragm subjected to the combined pressures of the gas and liquid for operating said actuator.

JOHN S. BAKER.

REFERENCES CITED

The following references are of record in the file of this patent:

UNITED STATES PATENTS

| Number | Name | Date |
|---|---|---|
| 978,103 | Bastian | Dec. 6, 1910 |
| 1,811,218 | Stinson | June 23, 1931 |
| 2,217,841 | Holinger | Oct. 15, 1940 |

FOREIGN PATENTS

| Number | Country | Date |
|---|---|---|
| 467,389 | Great Britain | June 16, 1937 |